(12) United States Patent
Shinoda

(10) Patent No.: US 9,866,042 B2
(45) Date of Patent: Jan. 9, 2018

(54) ELECTRONIC APPARATUS AND WIRELESS POWER TRANSMISSION SYSTEM

(71) Applicant: Murata Manufacturing Co., Ltd., Nagaokakyo-shi, Kyoto-fu (JP)

(72) Inventor: Satoshi Shinoda, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 200 days.

(21) Appl. No.: 14/948,690

(22) Filed: Nov. 23, 2015

(65) Prior Publication Data

US 2016/0079773 A1    Mar. 17, 2016

Related U.S. Application Data

(63) Continuation of application No. PCT/JP2014/064063, filed on May 28, 2014.

(30) Foreign Application Priority Data

Jun. 5, 2013    (JP) .................................. 2013-118461

(51) Int. Cl.
*H02J 7/00*    (2006.01)
*H02J 5/00*    (2016.01)
*H02J 7/02*    (2016.01)
*H02J 7/04*    (2006.01)
*H02J 50/05*   (2016.01)
*H02J 50/50*   (2016.01)

(52) U.S. Cl.
CPC .............. *H02J 5/005* (2013.01); *H02J 7/025* (2013.01); *H02J 7/04* (2013.01); *H02J 50/05* (2016.02); *H02J 50/50* (2016.02)

(58) Field of Classification Search
CPC .. H02J 5/005; H02J 50/05; H02J 7/025; H02J 7/04
USPC ........................................ 320/108; 307/104
See application file for complete search history.

(56) References Cited

U.S. PATENT DOCUMENTS 4,656,412 A * 4/1987 McLyman ............... H02J 7/025
                                                320/139
6,028,413 A * 2/2000 Brockmann ............ H02J 7/025
                                                320/108
(Continued)

FOREIGN PATENT DOCUMENTS

JP    H11-55878 A      2/1999
JP    2007-060829 A    3/2007
(Continued)

OTHER PUBLICATIONS

International Search Report issued for PCT/JP2014/064063, dated Jul. 15, 2014.
(Continued)

*Primary Examiner* — M'Baye Diao
(74) *Attorney, Agent, or Firm* — Arent Fox LLP

(57) ABSTRACT

A wireless power transmission system transmits power from a power transmitting apparatus to a relay power receiving apparatus by applying voltage to an active electrode in the power transmitting apparatus, which is opposed to an active electrode in the relay power receiving apparatus, and a passive electrode in the power transmitting apparatus, which is opposed to a passive electrode in the relay power receiving apparatus.

20 Claims, 11 Drawing Sheets

(56) References Cited

U.S. PATENT DOCUMENTS

| | | | |
|---|---|---|---|
| 6,336,042 B1* | 1/2002 | Dawson | H04W 88/085 |
| | | | 455/101 |
| 6,430,064 B1* | 8/2002 | Tsuchimoto | H02J 5/005 |
| | | | 363/22 |
| 6,897,756 B2* | 5/2005 | Haisch | H02J 5/005 |
| | | | 336/117 |
| 8,319,489 B2* | 11/2012 | Ide | H02J 5/005 |
| | | | 323/355 |
| 8,358,103 B2* | 1/2013 | Eastlack | H02J 7/025 |
| | | | 320/108 |
| 8,716,899 B2* | 5/2014 | Yi | H02J 5/005 |
| | | | 307/104 |
| 9,203,475 B2* | 12/2015 | Kim | H04B 5/0093 |
| 9,231,429 B2* | 1/2016 | Kamata | H02J 7/025 |
| 9,641,223 B2* | 5/2017 | Miwa | H04B 5/0037 |
| 9,667,084 B2* | 5/2017 | Pigott | H02J 7/025 |
| 9,692,238 B2* | 6/2017 | Matsumoto | H02J 50/80 |
| 2009/0200870 A1* | 8/2009 | Uno | H02M 3/155 |
| | | | 307/80 |
| 2012/0223593 A1* | 9/2012 | Kamata | H02J 7/025 |
| | | | 307/104 |
| 2013/0026981 A1 | 1/2013 | VanDerLee | |
| 2013/0069446 A1* | 3/2013 | Bai | H02J 17/00 |
| | | | 307/104 |
| 2013/0099583 A1 | 4/2013 | Lee | |
| 2014/0200626 A1* | 7/2014 | Campbell | A61N 1/375 |
| | | | 607/46 |
| 2014/0253027 A1* | 9/2014 | Obayashi | H02J 7/025 |
| | | | 320/108 |
| 2014/0300201 A1 | 10/2014 | Ichikawa et al. | |
| 2015/0249483 A1* | 9/2015 | Ichikawa | H02J 5/005 |
| | | | 320/108 |

FOREIGN PATENT DOCUMENTS

| | | |
|---|---|---|
| JP | 2006-508542 A | 3/2008 |
| JP | 2010-263690 A | 11/2010 |
| JP | 2011-160634 A | 8/2011 |
| JP | 2013070514 A | 4/2013 |
| WO | WO 2013/073508 A1 | 4/2015 |

OTHER PUBLICATIONS

Written Opinion of the International Searching Authority issued for PCT/JP2014/064063, dated Jul. 25, 2014.

* cited by examiner

ELECTRONIC APPARATUS AND WIRELESS POWER TRANSMISSION SYSTEM

CROSS-REFERENCE TO RELATED APPLICATIONS

The present application is a continuation of PCT/JP2014/064063 filed May 28, 2014, which claims priority to Japanese Patent Application No. 2013-118461, filed Jun. 5, 2013, the entire contents of each of which are incorporated herein by reference.

FIELD OF THE INVENTION

The present invention relates to an electronic apparatus to which power is wirelessly transmitted from an external apparatus and a wireless power transmission system.

BACKGROUND OF THE INVENTION

Systems using magnetic-field coupling or electric-field coupling have hitherto been proposed as systems that wirelessly transmit power to portable electronic devices. In the magnetic-field coupling systems, power is transmitted from a primary coil in a power transmitting apparatus to a secondary coil in a power receiving apparatus using the magnetic field. In the electric-field coupling systems, upon proximity (placement) of the power receiving apparatus to (in) the power transmitting apparatus, an electrode in the power transmitting apparatus comes close to an electrode in the power receiving apparatus with a gap interposed therebetween, strong electric field is generated between the two electrodes, and power is transmitted using the electric-field coupling between the electrodes.

In both the magnetic-field coupling and the electric-field coupling, one-to-one relationship is generally established between the power transmitting apparatus and the power receiving apparatus. In order to simultaneously transmit the power to multiple power receiving apparatuses, for example, in the case of the magnetic-field coupling, it is necessary to increase the size of the primary coil in the power transmitting apparatus so that the secondary coils in the multiple power receiving apparatuses are magnetically coupled to the primary coil in the power transmitting apparatus. For electric-field coupling, it is necessary to increase the size of the electrode in the power transmitting apparatus so that the electrodes in the multiple power receiving apparatuses are electrically coupled to the electrode in the power transmitting apparatus.

Patent Document 1 discloses a system concerning a power receiving apparatus to which power is transmitted from a power transmitting apparatus and which is capable of transmitting power to another apparatus. The power receiving apparatus receives alternating-current voltage from the power transmitting apparatus, converts the alternating-current voltage into direct-current voltage to charge a secondary cell with the power, and converts the direct-current voltage into the alternating-current voltage again to transmit the power to another apparatus. Accordingly, it is possible to transmit the power from the one power transmitting apparatus to the two power receiving apparatuses.

Patent Document 1: U.S. Patent Application Publication No. 2013/0026981.

However, for the power receiving apparatus described in Patent Document 1, it is necessary to convert the alternating-current voltage that is received into the direct-current voltage and convert the direct-current voltage into the alternating-current voltage again, there are problems in that loss occurs in the conversion and power transmission efficiency is reduced.

SUMMARY OF THE INVENTION

Accordingly, in order to resolve the above problems, the present system and method described herein provide an electronic apparatus capable of transmitting power that is received to another apparatus without reducing the transmission efficiency and a wireless power transmission system including the electronic apparatus.

The present invention provides an electronic apparatus including an input unit that receives power from outside; a supply circuit that rectifies and smooths the power received by the input unit and supplies the power to a load; and an output unit that is electrically connected to the input unit and transmits the power received by the input unit to the outside.

With the above configuration, the received power can be rectified, smoothed, and supplied to the load and the received power can further be transmitted to another apparatus from the output unit without the rectification and the smoothing. Thus, it is not necessary to convert direct-current power that has been converted into alternating-current power again for the power transmission in the transmission of the power to another apparatus. Accordingly, no loss is caused by the conversion to suppress a reduction in transmission efficiency.

It is preferred that the input unit include a first active electrode opposed to an external-side active electrode in an external apparatus and a first passive electrode opposed to an external-side passive electrode in the external apparatus, that the first active electrode be opposed to the external-side active electrode and the first passive electrode be opposed to the external-side passive electrode to receive voltage induced through capacitive coupling, and that the output unit include a second active electrode connected to the first active electrode and a second passive electrode connected to the first passive electrode.

With the above configuration, it is possible to transmit the received power to another apparatus through the electric-field coupling without reducing the transmission efficiency.

It is preferred that the input unit include an input-side coil magnetically coupled to an external-side coil in the external apparatus and receive current excited by magnetic coupling between the input-side coil and the external-side coil, and that the output unit include an output-side coil connected to the input-side coil.

With the above configuration, it is possible to transmit the received power to another apparatus through the magnetic-field coupling without reducing the transmission efficiency.

The electronic apparatus preferably further includes a switching unit that connects the input unit to the supply circuit or disconnects the input unit from the supply circuit and that connects the input unit to the output unit or disconnects the input unit from the output unit; and a control unit that controls switching of the switching unit.

With the above configuration, since it is possible to switch between the power supply to the load and the power transmission to another apparatus, if needed, the received power is capable of being effectively used.

The control unit preferably controls the switching of the switching unit so that the power received by the input unit is alternately output to the output unit and the supply circuit.

With the above configuration, adjusting the time ratio when the power is supplied to supply destinations allows the distribution ratio between the power supplied to the load and the power supplied to the output unit to be adjusted.

It is preferred that the supply circuit be of a bidirectional input-output type and be connected to the output unit and that the switching unit connect the supply circuit to the output unit or disconnect the supply circuit from the output unit.

With the above configuration, the load to which the supply circuit supplies the power is capable being connected to the output unit or being disconnected from the output unit. Accordingly, when the load is, for example, a secondary cell, it is possible to transmit the power to an external apparatus via the output unit using the secondary cell as a power source.

The switching unit preferably further includes a first switch provided between the supply circuit and the input unit; a second switch provided between a node between the first switch and the input unit and the output unit; and a third switch connected between a node between the first switch and the second switch and the input unit.

With the above configuration, switching between the first to third switches allows the power transmission path in the electronic apparatus to be changed. For example, connecting the input unit to the output unit allows the power received by the input unit to be directly supplied to the output unit. Alternatively, connecting the input unit to the supply circuit allows the power that is received to be supplied to the load. The appropriate change of the transmission path, if needed, enables the efficient power transmission.

It is preferred that the electronic apparatus further include a transformer including a primary winding connected to the input unit and a secondary winding connected to the output unit, that the secondary winding include a tap, and that the supply circuit be connected to the tap and the output unit.

With the above configuration, adjusting the turn ratio of the transformer allows the distribution ratio between the power supplied to the output unit and the power supplied to the load to be adjusted.

According to the present invention, it is possible to supply received power to a load and to transmit the power to another apparatus without reducing the transmission efficiency.

DETAILED DESCRIPTION OF THE EXEMPLARY EMBODIMENTS (First Embodiment)

Figure 1:
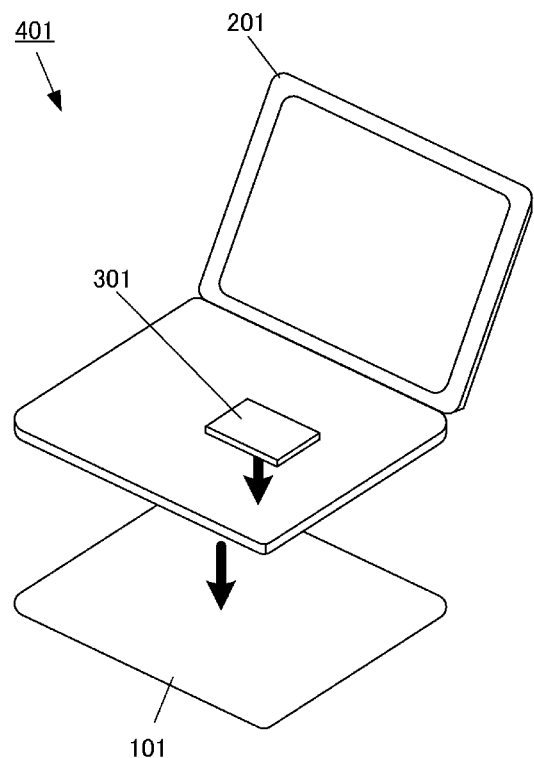
FIG. 1 illustrates a wireless power transmission system according to a first embodiment.

FIG. 1 illustrates a wireless power transmission system according to a first embodiment.

A wireless power transmission system 401 according to the present embodiment includes a power transmitting apparatus 101 and two power receiving apparatuses 201 and 301. The power transmitting apparatus 101 is embedded in, for example, a desk in a state in which part of the power transmitting apparatus 101 is exposed. Upon placement of the power receiving apparatus 201 on the exposed surface of the power transmitting apparatus 101, power is wirelessly transmitted from the power transmitting apparatus 101 to the power receiving apparatus 201. The power receiving apparatus 201 is, for example, a notebook personal computer (PC) or a tablet terminal. The power receiving apparatus 201 corresponds to an electronic apparatus and a first power receiving apparatus of the present invention.

Upon placement of the power receiving apparatus 301 on the power receiving apparatus 201, the power from the power transmitting apparatus 101 is wirelessly transmitted to the power receiving apparatus 301 via the power receiving apparatus 201. In other words, the power receiving apparatus 201 functions as a relay apparatus for power transmission from the power transmitting apparatus 101 to the power receiving apparatus 301. The power receiving apparatus 301 is, for example, an electronic device, such as a cellular phone or a portable music player, which is smaller than the power receiving apparatus 201 and which is capable of being placed on the power receiving apparatus 201. The power receiving apparatus 301 corresponds to an external apparatus and a second power receiving apparatus of the present invention. The power receiving apparatus 201 is hereinafter referred to as a relay power receiving apparatus 201.

Figure 2:
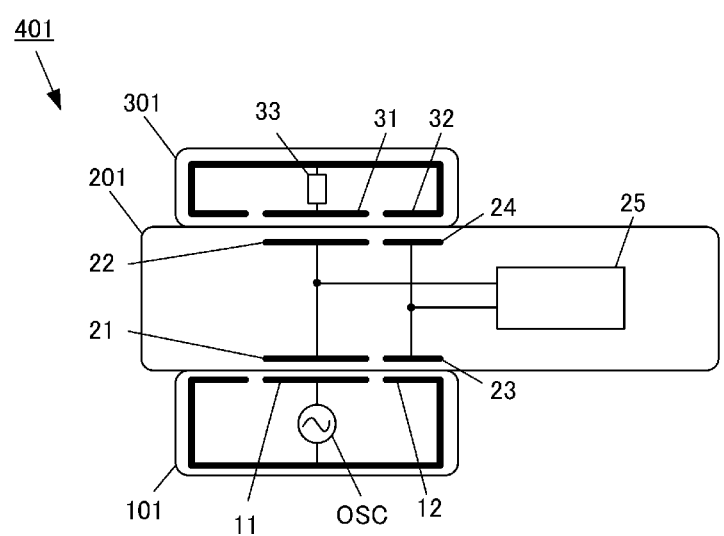
FIG. 2 is a cross-sectional view in a state in which a relay power receiving apparatus and a power receiving apparatus are placed on a power transmitting apparatus.

FIG. 2 is a cross-sectional view in a state in which the relay power receiving apparatus 201 and the power receiving apparatus 301 are placed on the power transmitting apparatus 101.

The power transmitting apparatus 101 includes an active electrode 11, a passive electrode 12, and a high-frequency voltage generating circuit OSC. The high-frequency voltage generating circuit OSC generates alternating-current voltage of, for example, 100 kHz to several tens MHz. The alternating-current voltage is stepped up and is applied to the active electrode 11 and the passive electrode 12. The active electrode 11 has a plate shape and is provided along a placement face on which the relay power receiving apparatus 201 is placed. The passive electrode 12 is provided along a casing of the power transmitting apparatus 101 and surrounds the high-frequency voltage generating circuit OSC and the active electrode 11. Surrounding the high-frequency voltage generating circuit OSC and the active electrode 11 by the passive electrode 12 suppresses unnecessary radiation from a high-voltage portion, such as the active electrode 11.

The relay power receiving apparatus 201 includes active electrodes 21 and 22, passive electrodes 23 and 24, and a load supply circuit 25. The active electrode 21 and the passive electrode 23 are provided along a bottom face of the relay power receiving apparatus 201, which is in contact with the placement face of the power transmitting apparatus 101 when the relay power receiving apparatus 201 is placed on the power transmitting apparatus 101. Upon placement of the relay power receiving apparatus 201 on the power transmitting apparatus 101, the active electrode 21 is opposed to the active electrode 11 and the passive electrode 23 is opposed to the passive electrode 12.

The active electrode 22 and the passive electrode 24 are provided along a top face opposed to the bottom face of the relay power receiving apparatus 201. The active electrode 22 is electrically connected to the active electrode 21. The passive electrode 24 is electrically connected to the passive electrode 23.

The active electrode 22 and the passive electrode 24 may be provided on a side face of the relay power receiving apparatus 201. In this case, the power receiving apparatus 301 is placed on a side of the relay power receiving apparatus 201 (on the desk in which the power transmitting apparatus 101 is provided). The placement of the power receiving apparatus 301 on the side of the relay power receiving apparatus 201 allows the power to be transmitted from the relay power receiving apparatus 201 to the power receiving apparatus 301 while using the relay power receiving apparatus 201 without impeding the use of the relay power receiving apparatus 201 during the power transmission from the power transmitting apparatus 101.

The load supply circuit 25 is connected to the active electrodes 21 and 22 and the passive electrodes 23 and 24. The load supply circuit 25 steps up the alternating-current voltage induced at the active electrode 21 and the passive electrode 23, rectifies and smooths the stepped-up alternating-current voltage, and supplies the alternating-current voltage to a load. The load is, for example, a secondary cell in the relay power receiving apparatus 201. Application of the alternating-current voltage to the active electrode 11 and the passive electrode 12 in the power transmitting apparatus 101 causes the active electrodes 11 and 21 to be capacitively coupled to each other and causes the passive electrodes 12 and 23 to be capacitively coupled to each other. As a result, the alternating-current voltage is induced at the active electrode 21 and the passive electrode 23. As will be discussed in detail below, the load supply circuit 25 includes circuitry as known to those skilled in the art that rectifies and smooths the alternating-current voltage and supplies the alternating-current voltage to the load.

The power receiving apparatus 301 includes an active electrode 31, a passive electrode 32, and a load supply circuit 33. When the power receiving apparatus 301 is placed on the top face of the relay power receiving apparatus 201, the active electrode 31 and the passive electrode 32 are provided along a rear face of the power receiving apparatus 301, which is in contact with the top face of the relay power receiving apparatus 201. The rear face of the power receiving apparatus 301 is a face opposed to the front face where a liquid crystal display screen is provided when the power receiving apparatus 301 is, for example, a cellular phone including the liquid crystal display screen. When the power receiving apparatus 301 is placed on the relay power receiving apparatus 201, the active electrode 31 is opposed to the active electrode 22 and the passive electrode 32 is opposed to the passive electrode 24. The passive electrode 32 is provided along a casing of the power receiving apparatus 301 and surrounds the load supply circuit 33 and the active electrode 31. Surrounding the load supply circuit 33 and the active electrode 31 by the passive electrode 32 suppresses unnecessary radiation from a high-voltage portion, such as the active electrode 31.

The load supply circuit 33 is connected to the active electrode 31 and the passive electrode 32. The load supply circuit 33 steps up the alternating-current voltage induced at the active electrode 31 and the passive electrode 32, rectifies and smooths the stepped-up alternating-current voltage, and supplies the alternating-current voltage to a load. The load is, for example, a secondary cell in the power receiving apparatus 301. Upon induction of the alternating-current voltage at the active electrode 21 and the passive electrode 23 in the relay power receiving apparatus 201, the alternating-current voltage is applied to the active electrode 22 and the passive electrode 24 connected to the active electrode 21 and the passive electrode 23, respectively. The active electrode 22 is capacitively coupled to the active electrode 31 and the passive electrode 24 is capacitively coupled to the passive electrode 32. As a result, the alternating-current voltage is induced at the active electrode 31 and the passive electrode 32. The load supply circuit 33 rectifies and smooths the alternating-current voltage and supplies the alternating-current voltage to the load.

In other words, when the power is transmitted from the power transmitting apparatus 101 to the relay power receiving apparatus 201, the power from the power transmitting apparatus 101 is transmitted also to the power receiving apparatus 301 via the relay power receiving apparatus 201. As described above, in the present embodiment, the power is capable of being transmitted from the one power transmitting apparatus 101 to the multiple apparatuses 201 and 301. In addition, since the power receiving apparatus 301 is placed (stacked) on the relay power receiving apparatus 201, it is possible to decrease the horizontal required area in the charging.

Figure 3:
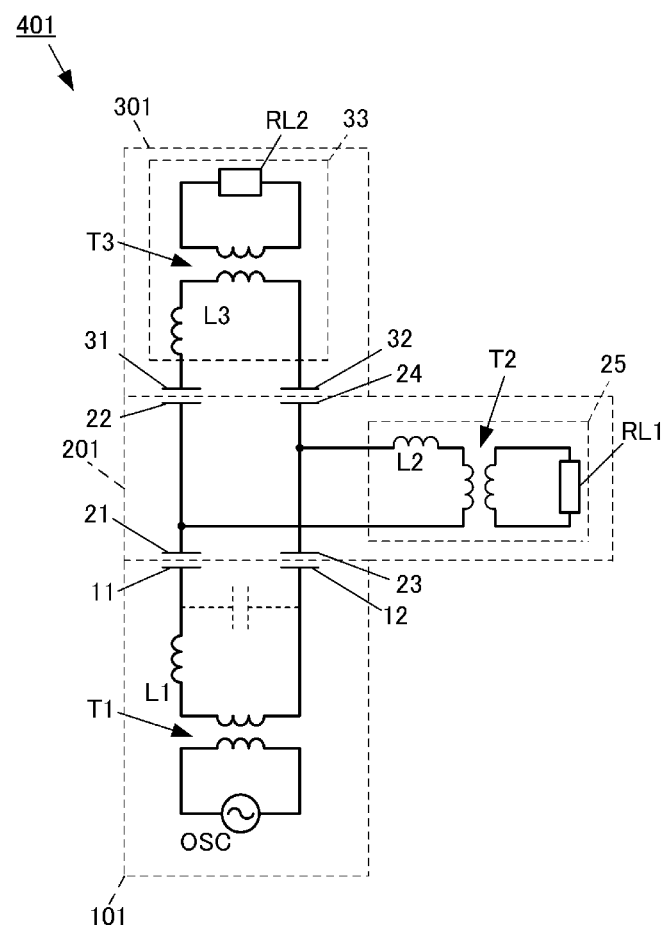
FIG. 3 is a circuit diagram of the wireless power transmission system according to the present embodiment.

FIG. 3 is a circuit diagram of the wireless power transmission system 401 according to the present embodiment. FIG. 3 is a circuit diagram of the wireless power transmission system 401 when the relay power receiving apparatus 201 is placed on the power transmitting apparatus 101 and the power receiving apparatus 301 is placed on the relay power receiving apparatus 201.

A step-up circuit composed of a step-up transformer T1 and an inductor L1 is connected to the active electrode 11 and the passive electrode 12 in the power transmitting apparatus 101. This step-up circuit steps up the alternating-current voltage generated by the high-frequency voltage generating circuit OSC and applies the alternating-current voltage between the active electrode 11 and the passive electrode 12. A capacitor illustrated by a broken line in FIG. 3 is a stray capacitance formed between the active electrode 11 and the passive electrode 12 and composes a resonant circuit with the inductor L1.

The active electrode 21 and the passive electrode 23 in the relay power receiving apparatus 201 are opposed to the active electrode 11 and the passive electrode 12, respectively, in the power transmitting apparatus 101 on which the relay power receiving apparatus 201 is placed with gaps interposed therebetween. Application of the alternating-current voltage to the active electrode 11 and the passive electrode 12 induces the alternating-current voltage at the active electrode 21 and the passive electrode 23 through the capacitive coupling. A step-down circuit composed of a step-down transformer T2 and an inductor L2 is connected to the active electrode 21 and the passive electrode 23 and the alternating-current voltage induced at the active electrode 21 and the passive electrode 23 is stepped down by the step-down transformer T2. A load circuit RL1 is connected to a secondary side of the step-down transformer T2. The load circuit RL1 is composed of a rectifier-smoothing circuit and a secondary cell. The load circuit RL1 rectifies and smooths the alternating-current transformer that has been stepped down to charge the secondary cell.

The active electrode 22 and the passive electrode 24 are connected to the active electrode 21 and the passive electrode 23, respectively. The alternating-current voltage induced at the active electrode 21 and the passive electrode 23 is directly supplied to the active electrode 22 and the passive electrode 24 without the rectification and the smoothing. Accordingly, since direct current-alternating current conversion of the power that is received is not performed in the relay power receiving apparatus 201 when the power is transmitted to the power receiving apparatus 301 via the active electrode 22 and the passive electrode 24, no loss is caused by the conversion and it is possible to prevent a reduction in efficiency of the power transmission from the relay power receiving apparatus 201 to the power receiving apparatus 301.

The active electrode 31 and the passive electrode 32 in the power receiving apparatus 301 are opposed to the active electrode 22 and the passive electrode 24, respectively, in the relay power receiving apparatus 201 on which the power receiving apparatus 301 is placed with gaps interposed therebetween. Upon induction of the alternating-current voltage at the active electrode 21 and the passive electrode 23 in the relay power receiving apparatus 201, the alternating-current voltage is applied to the active electrode 22 and the passive electrode 24. The active electrode 22 and the passive electrode 24 are capacitively coupled to the active electrode 31 and the passive electrode 32 opposed to the active electrode 22 and the passive electrode 24, respectively, to induce the alternating-current voltage also at the active electrode 31 and the passive electrode 32.

The load supply circuit 33 is connected to the active electrode 31 and the passive electrode 32. The load supply circuit 33 includes a step-down circuit composed of a step-down transformer T3 and an inductor L3. The alternating-current voltage induced at the active electrode 31 and the passive electrode 32 is stepped down by the step-down transformer T3. The load supply circuit 33 includes a load circuit RL2 connected to a secondary side of the step-down transformer T3. The load circuit RL2 is composed of a rectifier-smoothing circuit and a secondary cell. The load circuit RL2 rectifies and smooths the alternating-current transformer that has been stepped down to charge the secondary cell.

As described above, the wireless power transmission system 401 of the present embodiment is capable of transmitting the power also to the power receiving apparatus 301 via the relay power receiving apparatus 201 while the power from the power transmitting apparatus 101 is being transmitted to the relay power receiving apparatus 201. As a result, it is possible to simultaneously charge the secondary cells in the two apparatuses: the relay power receiving apparatus 201 and the power receiving apparatus 301. In addition, since the relay power receiving apparatus 201 directly transmits the power that is received to the power receiving apparatus 301 without converting the alternating-current voltage received from the power transmitting apparatus 101 into direct-current voltage and converting the direct-current voltage into the alternating-current voltage again, it is possible to reduce the loss caused by the conversion to achieve efficient power transmission.

Furthermore, since the wireless power transmission system 401 of the present embodiment has the configuration in which the power receiving apparatus 301 is vertically stacked and placed on the relay power receiving apparatus 201, it is possible to prevent increase in the placement areas of the apparatuses in a planar direction.

For example, if the secondary cell in the relay power receiving apparatus 201 is in a full charge state when the relay power receiving apparatus 201 and the power receiving apparatus 301 are simultaneously charged, the load circuit RL1 has high impedance. Accordingly, the power transmitted from the power transmitting apparatus 101 is transmitted only to the power receiving apparatus 301 and the secondary cell in the power receiving apparatus 301 is charged. As described above, even if the secondary cell in one apparatus is in the full charge state, it is possible to continue the transmission of the power to the other apparatus.

The relay power receiving apparatus 201 may have a configuration in which the voltage received from the power transmitting apparatus 101 is transmitted to another apparatus, which is different from the power receiving apparatus 301 (another apparatus, which is different from the power receiving apparatus 301, is charged with the voltage received from the power transmitting apparatus 101).

Figure 4:
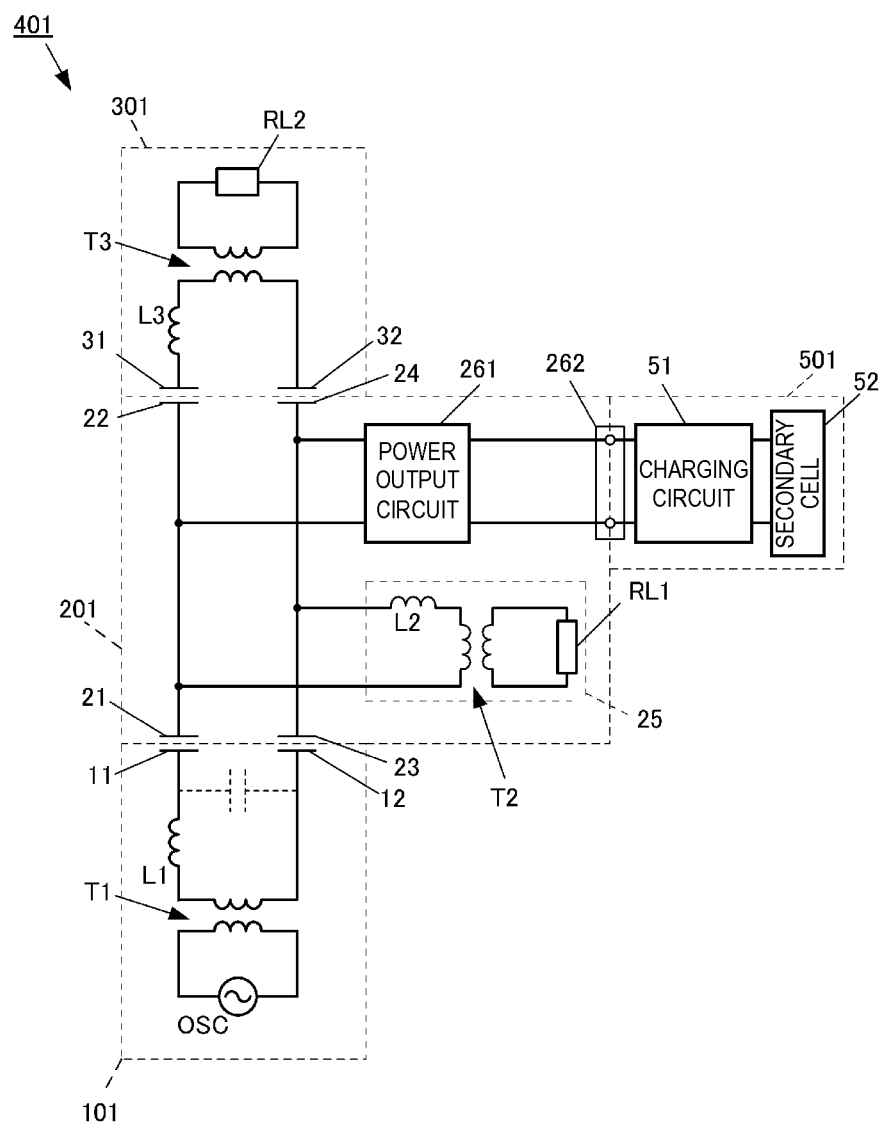
FIG. 4 is a circuit diagram illustrating another exemplary wireless power transmission system.
Figure 5:
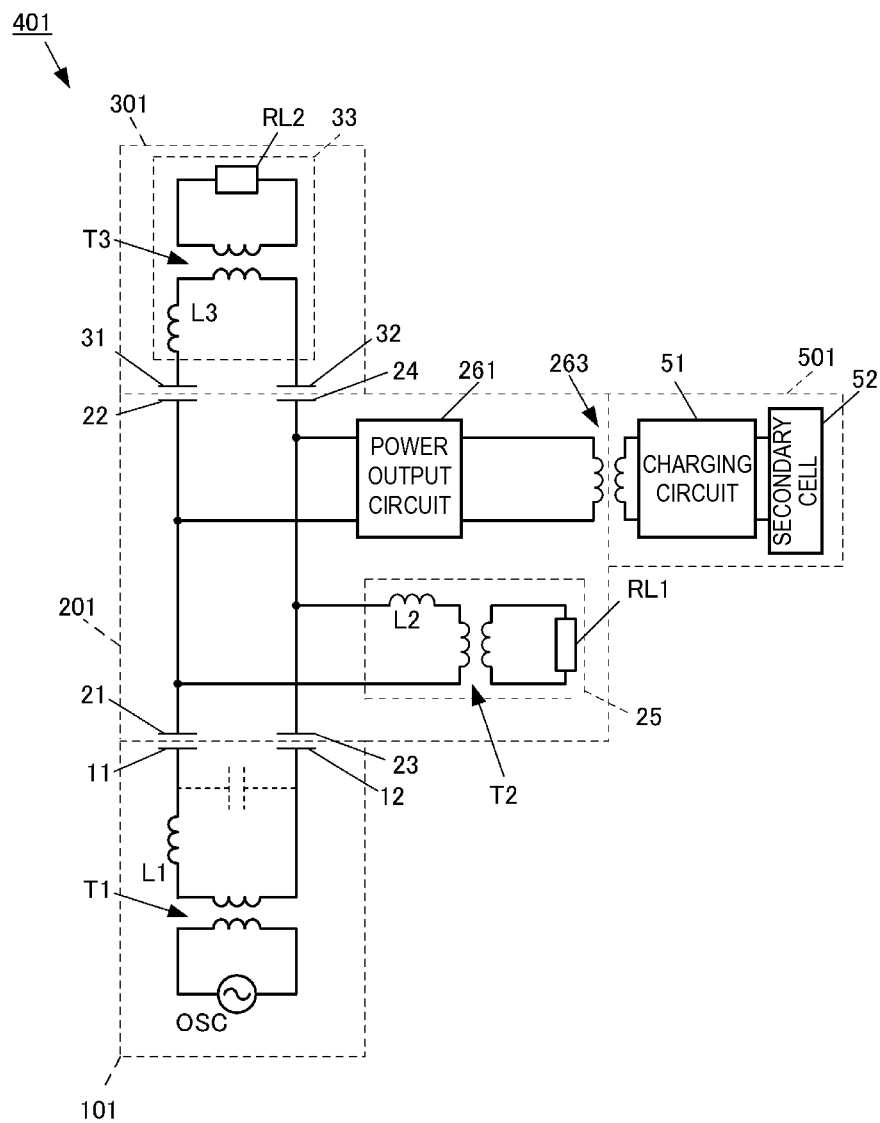
FIG. 5 is a circuit diagram illustrating another exemplary wireless power transmission system.

FIG. 4 and FIG. 5 are circuit diagrams illustrating other examples of the wireless power transmission system 401. In the example illustrated in FIG. 4, the relay power receiving apparatus 201 includes a power output circuit 261. The power output circuit 261 is connected to the active electrode 21 and the passive electrode 23. The power output circuit 261 steps down the alternating-current voltage induced at the active electrode 21 and the passive electrode 23 and rectifies and smooths the alternating-current voltage that is stepped down. An output side of the power output circuit 261 is connected to, for example, a universal serial bus (USB) terminal 262. The power output circuit 261 outputs direct-current voltage to an external apparatus 501 connected to the USB terminal 262. The external apparatus 501, for example, steps down the voltage with a charging circuit 51 to charge a secondary cell 52.

In the example illustrated in FIG. 5, power is transmitted from the relay power receiving apparatus 201 to the external apparatus 501 using the magnetic-field coupling. The power output circuit 261 in the relay power receiving apparatus 201 is connected to a primary winding of a transformer 263. The charging circuit 51 in the external apparatus 501 is connected to a secondary winding of the transformer 263. Upon induction of the alternating-current voltage at the active electrode 21 and the passive electrode 23 in the relay power receiving apparatus 201, the power is transmitted also to the external apparatus 501 via the transformer 263. In this case, the power is capable of being wirelessly transmitted from the relay power receiving apparatus 201 to the external apparatus 501.

(Second Embodiment)

Figure 6:
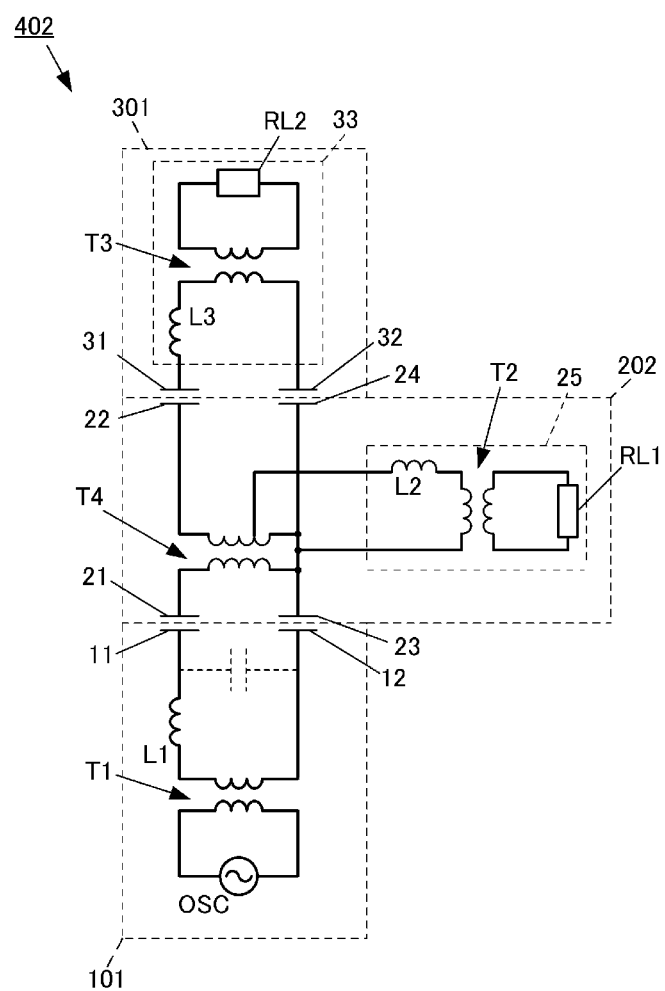
FIG. 6 is a circuit diagram of a wireless power transmission system according to a second embodiment.

FIG. 6 is a circuit diagram of a wireless power transmission system 402 according to a second embodiment. The wireless power transmission system 402 according to the present embodiment includes the power transmitting apparatus 101, a relay power receiving apparatus 202, and the power receiving apparatus 301. Since the power transmitting apparatus 101 and the power receiving apparatus 301 are the same as those in the first embodiment, a description of the power transmitting apparatus 101 and the power receiving apparatus 301 is omitted herein.

The relay power receiving apparatus 202 includes a transformer T4. A primary winding of the transformer T4 is connected to the active electrode 21 and the passive electrode 23 and a secondary winding of the transformer T4 is connected to the active electrode 22 and the passive electrode 24. The alternating-current voltage induced at the active electrode 21 and the passive electrode 23 is applied to the active electrode 22 and the passive electrode 24 via the transformer T4. In other words, the voltage corresponding to a turn ratio of the transformer T4 is applied to the active electrode 22 and the passive electrode 24. For example, the voltage applied to the active electrode 22 and the passive electrode 24 is increased with the increasing turn ratio of the transformer T4.

The secondary winding of the transformer T4 includes a tap and the load supply circuit 25 is connected to the tap. Part of the alternating-current voltage induced at the secondary winding of the transformer T4 is supplied to the load supply circuit 25 depending on the position of the tap.

As described above, in the present embodiment, adjusting the turn ratio of the transformer T4 and the tap position in the transformer T4 allows the voltage to be distributed to the relay power receiving apparatus 202 and the power receiving apparatus 301 to be adjusted.

(Third Embodiment)

Figure 7:
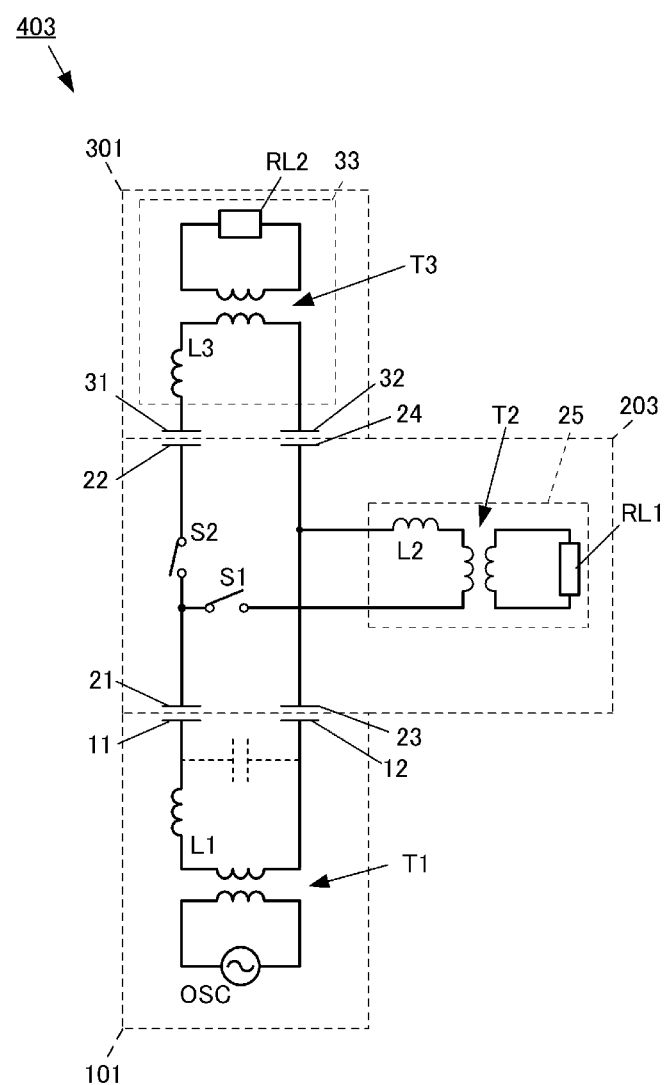
FIG. 7 is a circuit diagram of a wireless power transmission system according to a third embodiment.

FIG. 7 is a circuit diagram of a wireless power transmission system 403 according to a third embodiment. The wireless power transmission system 403 according to the present embodiment includes the power transmitting apparatus 101, a relay power receiving apparatus 203, and the power receiving apparatus 301. The power transmitted from the power transmitting apparatus 101 is simultaneously transmitted to both the power transmitting apparatus 101 and the power receiving apparatus 301 in the first embodiment. The third embodiment differs from the first embodiment in that the power transmitted from the power transmitting apparatus 101 is alternately transmitted to the relay power receiving apparatus 203 and the power receiving apparatus 301. The difference is described here. Since the power transmitting apparatus 101 and the power receiving apparatus 301 are the same as those in the first embodiment, a description of the power transmitting apparatus 101 and the power receiving apparatus 301 is omitted herein.

The relay power receiving apparatus 203 includes a switching element S1 connected between the active electrode 21 and the load supply circuit 25 and a switching element S2 connected between the active electrodes 21 and 22, in addition to the components in the relay power receiving apparatus 201 according to the first embodiment (refer to FIG. 3). The switching elements S1 and S2 are alternately turned on and off in response to a drive signal supplied from a control circuit (not illustrated). In other words, the power transmission path from the power transmitting apparatus 101 is capable of being switched in time division in the relay power receiving apparatus 203.

When the switching element S1 is turned on and the switching element S2 is turned off, the voltage induced at the active electrode 21 and the passive electrode 23 is supplied to the load supply circuit 25. In contrast, when the switching element S1 is turned off and the switching element S2 is turned on, the voltage induced at the active electrode 21 and the passive electrode 23 is supplied to the active electrode 22 and the passive electrode 24. Adjusting an on duty ratio of the switching elements S1 and S2 allows the distribution ratio between the power supplied to the load supply circuit 25 and the power supplied the active electrode 22 and the passive electrode 24 to be adjusted.

As described above, in the present embodiment, adjusting the on duty ratio of the switching elements S1 and S2 allows the voltage distributed to the relay power receiving apparatus 203 and the power receiving apparatus 301 to be adjusted, as in the second embodiment.

(Fourth Embodiment)

Figure 8:
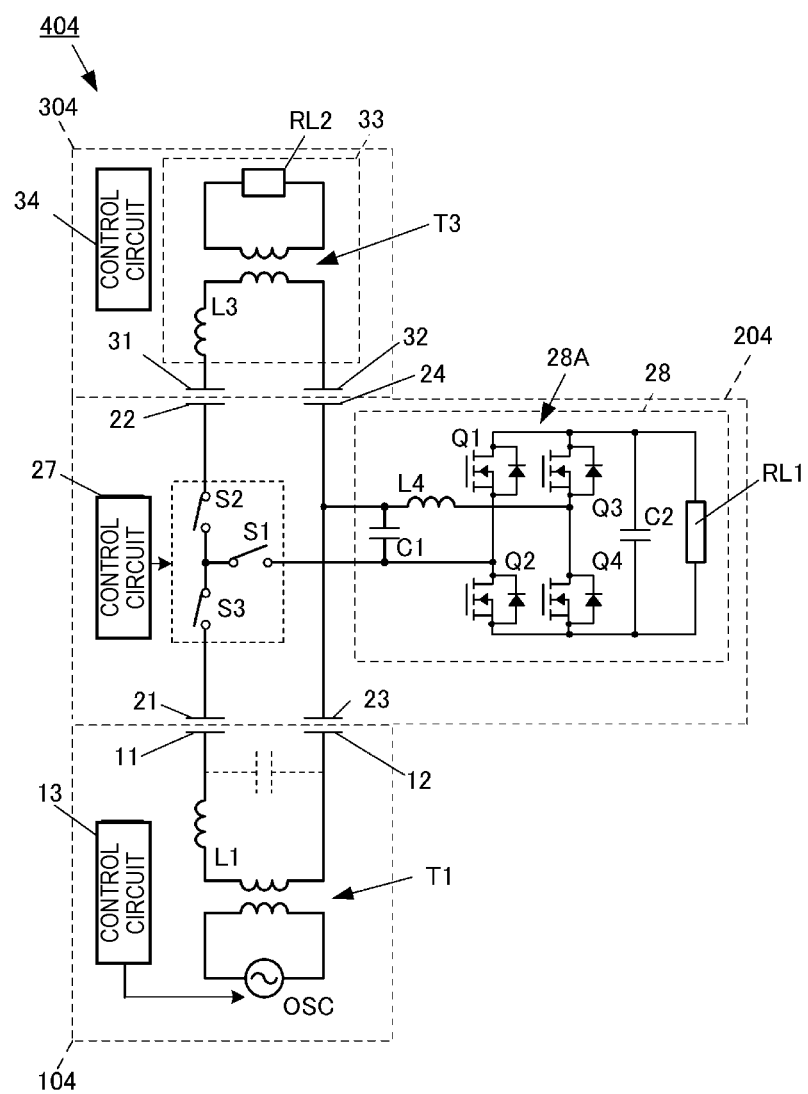
FIG. 8 is a circuit diagram of a wireless power transmission system according to a fourth embodiment.

FIG. 8 is a circuit diagram of a wireless power transmission system 404 according to a fourth embodiment. The wireless power transmission system 404 according to the present embodiment includes a power transmitting apparatus 104, a relay power receiving apparatus 204, and a power receiving apparatus 304. The wireless power transmission system 404 according to the present embodiment is capable of transmitting power from the power transmitting apparatus 104 only to the relay power receiving apparatus 204, only to the power receiving apparatus 304, or to both the relay power receiving apparatus 204 and the power receiving apparatus 304 simultaneously. In addition, the wireless power transmission system 404 is capable of transmitting the power from the relay power receiving apparatus 204 to the power receiving apparatus 304 using the voltage charged in a secondary cell in the relay power receiving apparatus 204 as a power source. In other words, the relay power receiving apparatus 204 also functions as a power transmitting apparatus for the power receiving apparatus 304.

The power transmitting apparatus 104 includes a control circuit 13. The control circuit 13 drives and controls the high-frequency voltage generating circuit OSC to start or stop the power transmission. The control circuit 13 has a communication function and wirelessly communicates with a control circuit 27 in the relay power receiving apparatus 204 and a control circuit 34 in the power receiving apparatus 304 described below.

The power receiving apparatus 304 includes the control circuit 34. The control circuit 34 determines whether the secondary cell in the load circuit RL2 is in the full charge state. The control circuit 34 has a communication function and wirelessly communicates with the control circuit 13 in the power transmitting apparatus 104 and the control circuit 27 in the relay power receiving apparatus 204 described below.

The control circuits may communicate with each other by superimposing a data modulation signal using the power transmission path, instead of the wireless communication.

The relay power receiving apparatus 204 includes a load supply circuit 28 connected to the active electrode 21 and the passive electrode 23. The load supply circuit 28 includes a bidirectional alternating current-direct current (AC-DC) converter 28A. The bidirectional AC-DC converter 28A includes a capacitor C1 and an inductor L4, which step up, rectify, and smooth the alternating-current voltage induced at the active electrode 21 and the passive electrode 23; four metal oxide semiconductor field effect transistors (MOSFETs) Q1, Q2, Q3, and Q4; and a capacitor C2 that smooths the voltage to be supplied to the load circuit RL1.

The bidirectional AC-DC converter 28A controls switching of the MOSFETs Q1, Q2, Q3, and Q4 to perform bidirectional AC-DC conversion. In other words, the bidirectional AC-DC converter 28A is capable of supplying the voltage induced at the active electrode 21 and the passive electrode 23 to the load circuit RL1 and is capable of supplying the voltage at the secondary cell in the load circuit RL1 to the active electrode 22 and the passive electrode 24.

In addition, the relay power receiving apparatus 204 includes the switching elements S1 and S2, as in the third embodiment, and also includes a switching element S3 connected between a node between the switching elements S1 and S2 and the active electrode 21. Furthermore, the relay power receiving apparatus 204 includes the control circuit 27 that controls switching of the switching elements S1, S2, and S3.

In the relay power receiving apparatus 204, the control circuit 27 controls the switching of the switching elements S1 to S3 to switch the power transmission path in the relay power receiving apparatus 204 to four charge states. When the switching elements S1 to S3 are turned on, the alternating-current voltage induced at the active electrode 21 and the passive electrode 23 is supplied to both the load supply circuit 28 and the active electrode 22 and the passive electrode 24 (Charge state 1). When the switching elements S1 and S3 are turned on and the switching element S2 is turned off, the alternating-current voltage induced at the active electrode 21 and the passive electrode 23 is supplied only to the load supply circuit 28 (Charge state 2). When the switching elements S2 and S3 are turned on and the switching element S1 is turned off, the alternating-current voltage induced at the active electrode 21 and the passive electrode 23 is supplied only to the active electrode 22 and the passive electrode 24 (Charge state 3). When the switching elements S1 and S2 are turned on and the switching element S3 is turned off, the voltage at the secondary cell in the load circuit RL1 is supplied to the active electrode 22 and the passive electrode 24 (Charge state 4).

Operations of the power transmitting apparatus 104, the relay power receiving apparatus 204, and the power receiving apparatus 304 in the switching of the charge state in the relay power receiving apparatus 204 will now be described.

Figure 9:
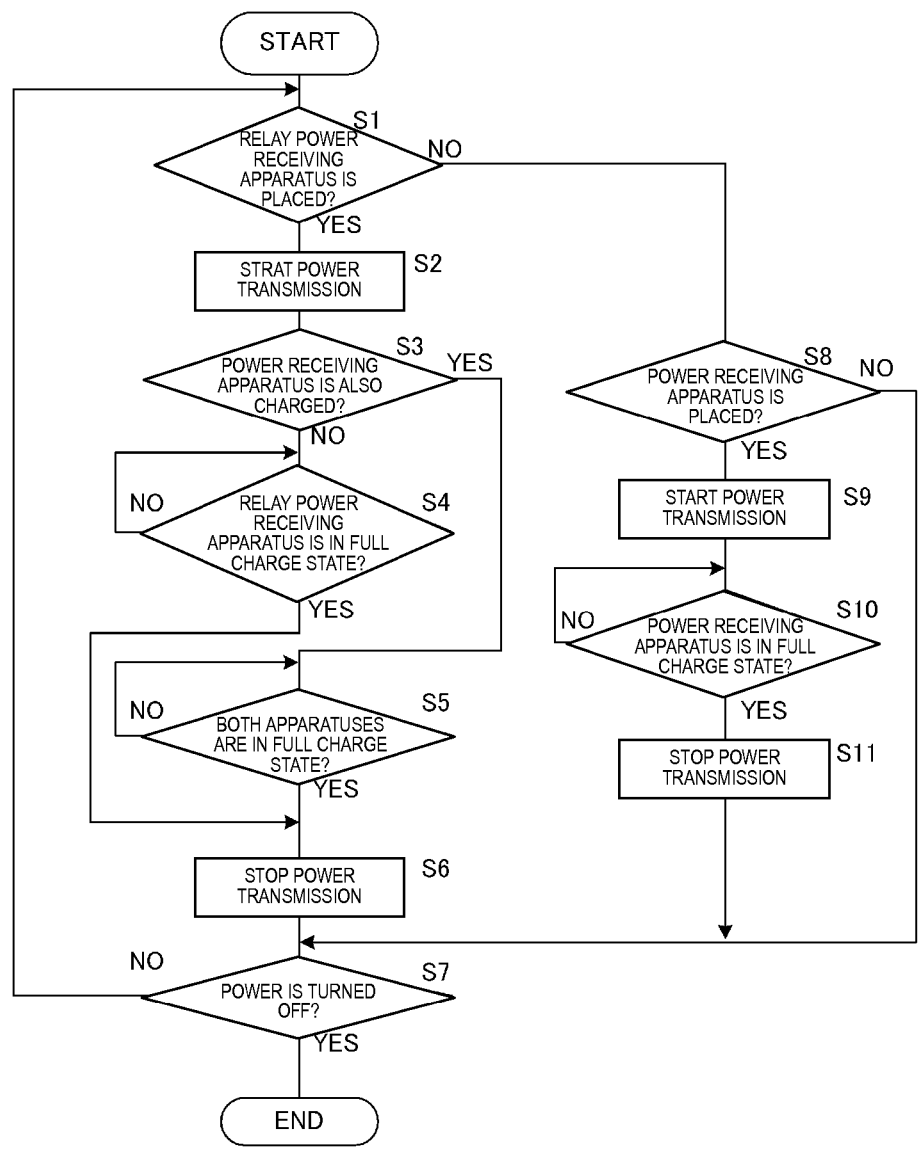
FIG. 9 is a flowchart illustrating an operational process of a control circuit in the power transmitting apparatus.

FIG. 9 is a flowchart illustrating an operational process of the control circuit 13 in the power transmitting apparatus 104.

The control circuit 13 determines whether the relay power receiving apparatus 204 is placed on the power transmitting apparatus 104 (Step S1). Specifically, the control circuit 13 determines whether the relay power receiving apparatus 204 is placed on the power transmitting apparatus 104 on the basis of ping received from the control circuit 27 in the relay power receiving apparatus 204. Whether the relay power receiving apparatus 204 is placed may be determined by, for example, an object detection sensor, instead of the determination by communication.

If the relay power receiving apparatus 204 is placed (YES in Step S1), the control circuit 13 drives the high-frequency voltage generating circuit OSC and starts power transmission to the relay power receiving apparatus 204 (Step S2). The control circuit 13 determines whether the power receiving apparatus 304 is placed on the relay power receiving apparatus 204 and the power receiving apparatus 304 is also charged via the relay power receiving apparatus 204 (the power is transmitted to the power receiving apparatus 304 via the relay power receiving apparatus 204) (Step S3). The control circuit 13 determines whether the power receiving apparatus 304 is charged by receiving data from the control circuit 27 in the relay power receiving apparatus 204.

If the power receiving apparatus 304 is not charged (NO in Step S3), the control circuit 13 receives data from the control circuit 27 to determine whether the secondary cell in the relay power receiving apparatus 204 is in the full charge state (Step S4). If the secondary cell in the relay power receiving apparatus 204 is not in the full charge state (NO in Step S4), the process performs the processing in Step S4 again. If the secondary cell in the relay power receiving apparatus 204 is in the full charge state (YES in Step S4), the control circuit 13 stops the high-frequency voltage generating circuit OSC and stops the power transmission to the relay power receiving apparatus 204 (Step S6).

If the power receiving apparatus 304 is also charged (YES in Step S3), the control circuit 13 determines whether the secondary cells in both the relay power receiving apparatus 204 and the power receiving apparatus 304 are in the full charge state by receiving pieces of data from the control circuits 27 and 34 (Step S5). If the secondary cells in both of the apparatuses are not in the full charge state (NO in Step S5), the process performs the processing in Step S5 again. If the secondary cells in both of the apparatuses are in the full charge state (YES in Step S5), the control circuit 13 stops the high-frequency voltage generating circuit OSC and stops the power transmission to the relay power receiving apparatus 204 (Step S6).

In Step S7, the control circuit 13 determines whether the power transmitting apparatus 104 is turned off. If the power transmitting apparatus 104 is turned off (YES in Step S7), the process in FIG. 9 is terminated. If the power transmitting apparatus 104 is not turned off (NO in Step S7), the process goes back to Step S1.

If the relay power receiving apparatus 204 is not placed in the processing in Step S1 (NO in Step S1), the control circuit 13 determines whether the power receiving apparatus 304 is placed on the power transmitting apparatus 104 (Step S8). In this case, the power receiving apparatus 304 is directly placed on the power transmitting apparatus 104 not via the relay power receiving apparatus 204. The control circuit 13 determines whether the power receiving apparatus 304 is placed by transmitting ping to the control circuit 34 in the power receiving apparatus 304.

If the power receiving apparatus 304 is not placed (NO in Step S8), the process in FIG. 9 is terminated. If the power receiving apparatus 304 is placed (YES in Step S8), the control circuit 13 drives the high-frequency voltage generating circuit OSC and starts the power transmission to the power receiving apparatus 304 (Step S9). The control circuit 13 determines whether the secondary cell in the power receiving apparatus 304 is in the full charge state (Step S10). If the secondary cell in the power receiving apparatus 304 is not in the full charge state (NO in Step S10), the process repeats the processing in Step S10. If the secondary cell in the power receiving apparatus 304 is in the full charge state (YES in Step S10), the control circuit 13 stops the power transmission to the relay power receiving apparatus 204 (Step S11).

Even if the secondary cells in the relay power receiving apparatus 204 and the power receiving apparatus 304 are in the full charge state, the power transmitting apparatus 104 may continue the power transmission without stopping the power transmission.

Figure 10:
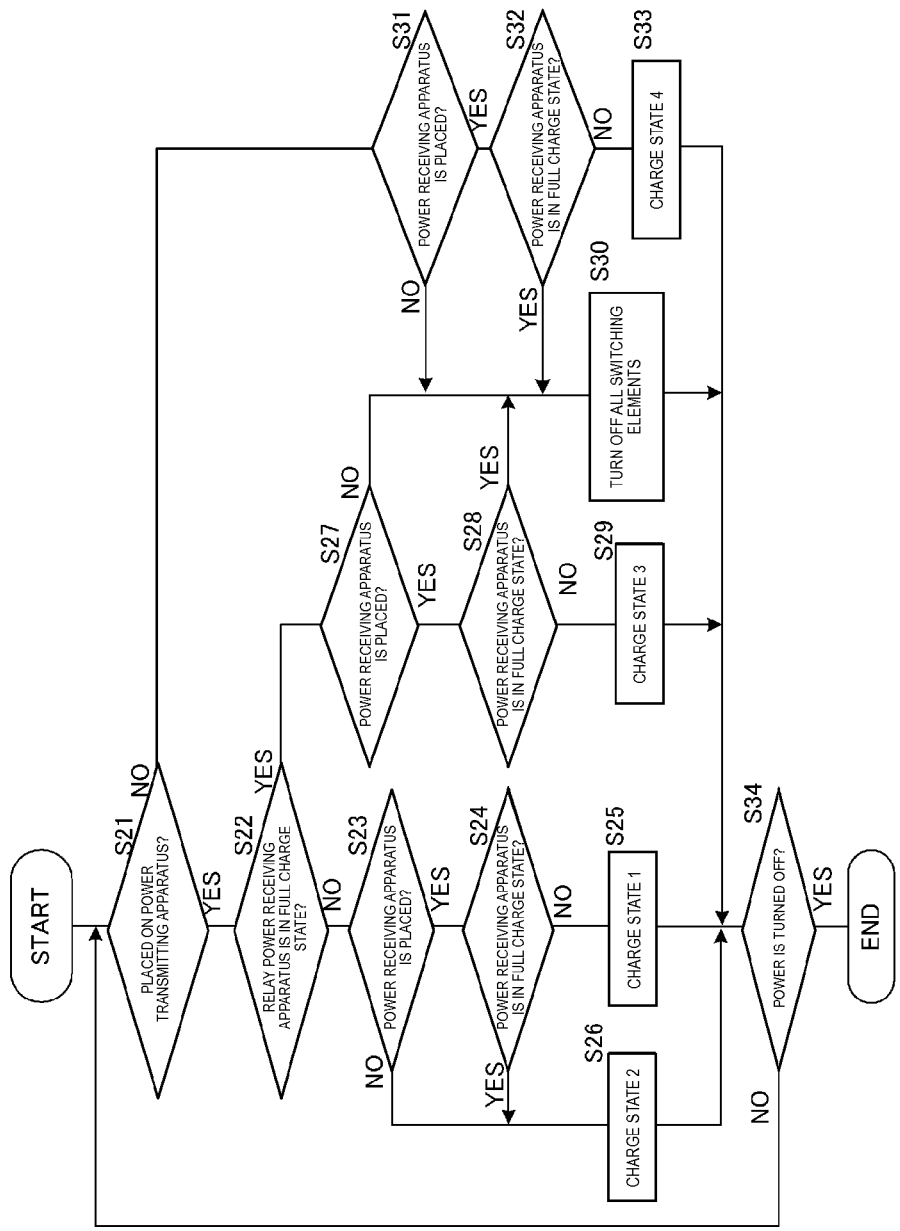
FIG. 10 is a flowchart illustrating an operational process of a control circuit in the relay power receiving apparatus.

FIG. 10 is a flowchart illustrating an operational process of the control circuit 27 in the relay power receiving apparatus 204. It is assumed that all the switching elements S1, S2, and S3 are turned off at start of the process in FIG. 10.

The control circuit 27 determines whether the relay power receiving apparatus 204 is placed on the power transmitting apparatus 104 (Step S21). Specifically, the control circuit 27 determines whether the relay power receiving apparatus 204 is placed on the power transmitting apparatus 104 on the basis of a response from the control circuit 13 that has received ping transmitted from the control circuit 27, as described above. If the relay power receiving apparatus 204 is placed on the power transmitting apparatus 104 (YES in Step S21), the control circuit 27 determines whether the secondary cell in the relay power receiving apparatus 204 is in the full charge state (Step S22).

If the secondary cell in the relay power receiving apparatus 204 is not in the full charge state (NO in Step S22), the control circuit 27 determines whether the power receiving apparatus 304 is placed on the relay power receiving apparatus 204 (Step S23). If the power receiving apparatus 304 is placed (YES in Step S23), the control circuit 27 determines whether the secondary cell in the power receiving apparatus 304 is in the full charge state (Step S24). If the secondary cell in the power receiving apparatus 304 is not in the full charge state (NO in Step S24), the control circuit 27 sets the power transmission path to Charge state 1 described above (Step S25). Specifically, the control circuit 27 turns on the switching elements S1, S2, and S3. As a result, the alternating-current voltage induced at the active electrode 21 and the passive electrode 23 is supplied to both the load supply circuit 28 and the active electrode 22 and the passive electrode 24. In other words, the power from the power transmitting apparatus 104 is transmitted to both the relay power receiving apparatus 204 and the power receiving apparatus 304.

If the power receiving apparatus 304 is not placed on the relay power receiving apparatus 204 (NO in Step S23) or if the secondary cell in the power receiving apparatus 304 is in the full charge state (YES in Step S24), the control circuit 27 sets the power transmission path to Charge state 2 described above (Step S26). Specifically, the control circuit 27 turns on the switching elements S1 and S3 and turns off the switching element S2. As a result, the alternating-current voltage induced at the active electrode 21 and the passive electrode 23 is supplied only to the load supply circuit 28. In other words, the power from the power transmitting apparatus 104 is transmitted only to the relay power receiving apparatus 204 and is not transmitted to the power receiving apparatus 304.

If the secondary cell in the relay power receiving apparatus 204 is in the full charge state (YES in Step S22), the control circuit 27 determines whether the power receiving apparatus 304 is placed on the relay power receiving apparatus 204 (Step S27). If the power receiving apparatus 304 is placed (YES in Step S27), the control circuit 27 determines whether the secondary cell in the power receiving apparatus 304 is in the full charge state (Step S28). If the secondary cell in the power receiving apparatus 304 is not in the full charge state (NO in Step S28), the control circuit 27 sets the power transmission path to Charge state 3 described above (Step S29). Specifically, the control circuit 27 turns on the switching elements S2 and S3 and turns off the switching element S1. As a result, the alternating-current voltage induced at the active electrode 21 and the passive electrode 23 is supplied only to the active electrode 22 and the passive electrode 24. In other words, the power supplied from the power transmitting apparatus 104 to the relay power receiving apparatus 204 is transmitted to the power receiving apparatus 304 via the relay power receiving apparatus 204.

If the power receiving apparatus 304 is not placed (NO in Step S27) or if the secondary cell in the power receiving apparatus 304 is in the full charge state (YES in Step S28), the control circuit 27 turns off all the switching elements S1, S2, and S3 (Step S30). When the relay power receiving apparatus 204 on which the power receiving apparatus 304 is not placed is in the full charge state or when the secondary cells in both the relay power receiving apparatus 204 and the power receiving apparatus 304 are in the full charge state, the control circuit 27 transmits a signal indicating that the relay power receiving apparatus 204 on which the power receiving apparatus 304 is not placed is in the full charge state or a signal indicating that the secondary cells in both the relay power receiving apparatus 204 and the power receiving apparatus 304 are in the full charge state to the power transmitting apparatus 104. Upon reception of the signal, the power transmission is stopped in the power transmitting apparatus 104.

If the relay power receiving apparatus 204 is not placed on the power transmitting apparatus 104 in Step S21 (NO in Step S21), the control circuit 27 determines whether the power receiving apparatus 304 is placed on the relay power receiving apparatus 204 (Step S31). If the power receiving apparatus 304 is placed (YES in Step S31), the control circuit 27 determines whether the secondary cell in the power receiving apparatus 304 is in the full charge state (Step S32). If the secondary cell in the power receiving apparatus 304 is not in the full charge state (NO in Step S32), the control circuit 27 sets the power transmission path to Charge state 4 described above (Step S33). Specifically, the control circuit 27 turns on the switching elements S1 and S2 and turns off the switching element S3. As a result, the voltage charged in the secondary cell in the load supply circuit 28 is supplied to the active electrode 22 and the passive electrode 24. In other words, the power is transmitted from the relay power receiving apparatus 204 to the power receiving apparatus 304 using the secondary cell in the relay power receiving apparatus 204 as the power source.

If the power receiving apparatus 304 is not placed (NO in Step S31) or if the secondary cell in the power receiving apparatus 304 is in the full charge state (YES in Step S32), the control circuit 27 turns off all the switching elements S1, S2, and S3 (Step S30).

The control circuit 27 determines whether the relay power receiving apparatus 204 is turned off (Step S34). If the power is turned off (YES in Step S34), the process in FIG. 10 is terminated. If the power is not turned off (NO in Step S34), the process goes back to Step S21.

Although a flowchart illustrating an operation of the control circuit 34 in the power receiving apparatus 304 is not illustrated, the control circuit 34 performs an operation in which the control circuit 34 responds to ping transmitted from the control circuit 13 in the power transmitting apparatus 104 or the control circuit 27 in the relay power receiving apparatus 204 and indicates to the control circuit 13 or 27 that the secondary cell in the power receiving apparatus 304 is in the full charge state.

Figure 11:
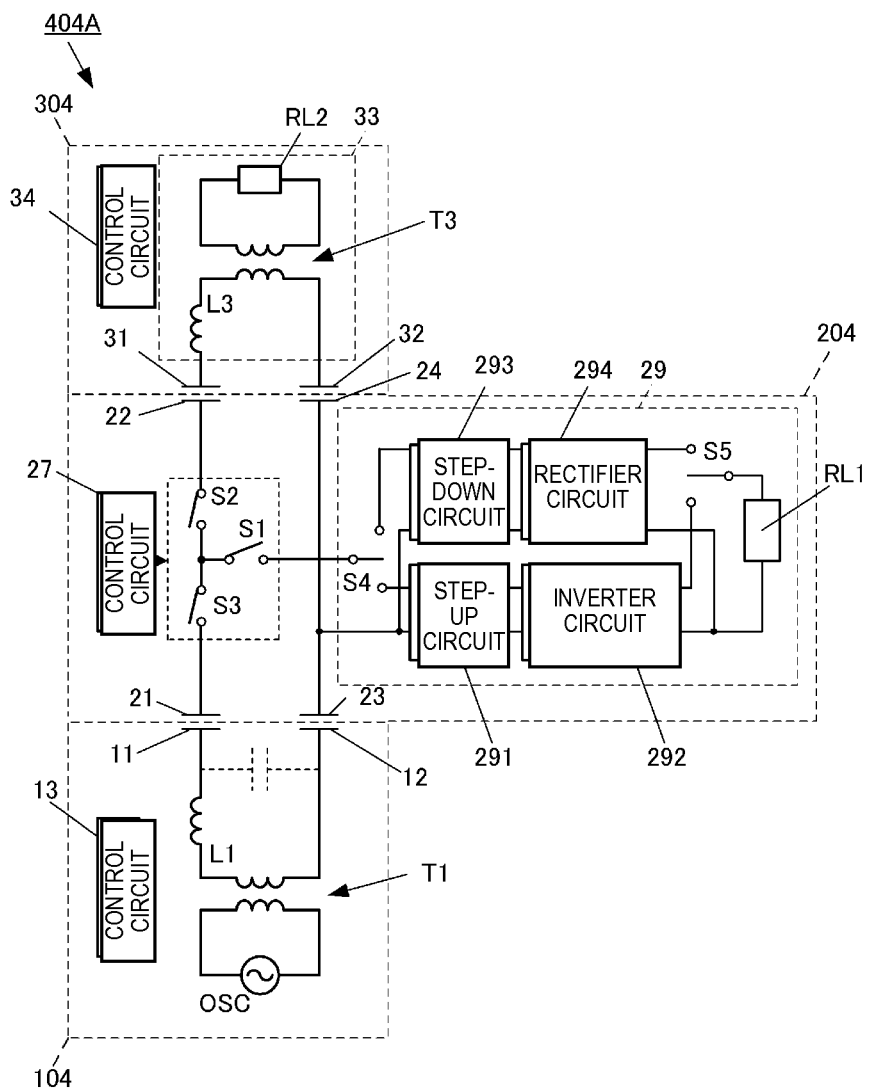
FIG. 11 illustrates an exemplary modification of the wireless power transmission system according to the fourth embodiment.

FIG. 11 illustrates an exemplary modification of the wireless power transmission system according to the fourth embodiment. In a wireless power transmission system 404A illustrated in the example in FIG. 11, a load supply circuit 29 is different from the load supply circuit 28 illustrated in FIG. 8. The load supply circuit 29 includes three-terminal switching elements S4 and S5, a step-up circuit 291, an inverter circuit 292, a step-down circuit 293, and a rectifier circuit 294.

The three-terminal switching element S4 is used to connect the step-up circuit 291 or the step-down circuit 293 to the switching element S1. The three-terminal switching element S5 is used to connect the inverter circuit 292 or the rectifier circuit 294 to the load circuit RL1. Connecting the step-up circuit 291 to the switching element S1 and connecting the inverter circuit 292 to the load circuit RL1 by switching between the three-terminal switching elements S4 and S5 allow the voltage induced at the active electrode 21 and the passive electrode 23 to be supplied to the load circuit RL1. Connecting the step-down circuit 293 to the switching element S1 and connecting the rectifier circuit 294 to the load circuit RL1 by switching between the three-terminal switching elements S4 and S5 allow the voltage at the secondary cell in the load circuit RL1 to be supplied to the active electrode 22 and the passive electrode 24.

As described above, in the fourth embodiment, switching between the switching elements S1 to S3 not only allows the secondary cells in the relay power receiving apparatus 204 and the power receiving apparatus 304 to be simultaneously charged but also allows the secondary cell in only one of the relay power receiving apparatus 204 and the power receiving apparatus 304 to be charged. Accordingly, it is possible to efficiently charge the secondary cells in the respective apparatuses 204 and 304. Since the voltage at the secondary cell in the relay power receiving apparatus 204 is capable of being supplied to the power receiving apparatus 304, it is possible to charge the secondary cell in the power receiving apparatus 304 even in a place where the power transmitting apparatus 104 is not provided.

(Fifth Embodiment)

Although the power is transmitted from the power transmitting apparatus to the relay power reception apparatus and from the relay power reception apparatus to the power receiving apparatus using the electric-field coupling in the above embodiments, a wireless power transmission system according to a fifth embodiment uses the magnetic-field coupling.

Figure 12:
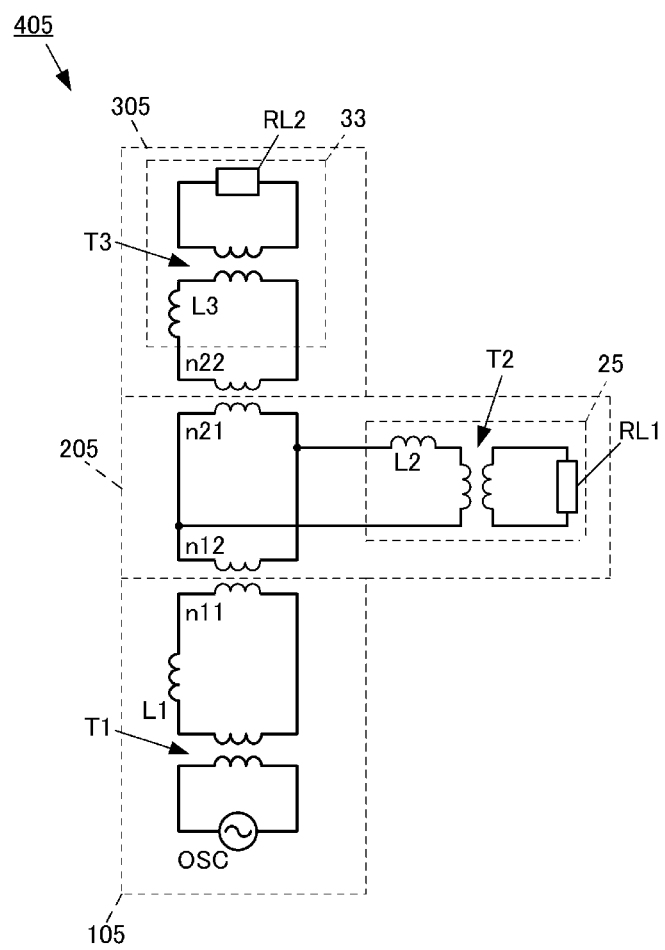
FIG. 12 is a circuit diagram of a wireless power transmission system according to a fifth embodiment, which uses magnetic-field coupling.

FIG. 12 is a circuit diagram of a wireless power transmission system 405 according to the fifth embodiment, which uses the magnetic-field coupling. The wireless power transmission system 405 includes a power transmitting apparatus 105, a relay power receiving apparatus 205, and a power receiving apparatus 305.

The power transmitting apparatus 105 includes a coil n11 to which the alternating-current voltage generated by the high-frequency voltage generating circuit OSC is applied, instead of the active electrode 11 and the passive electrode 12 described above in the first embodiment. The relay power receiving apparatus 205 includes a coil n12, instead of the active electrode 21 and the passive electrode 23 described above in the first embodiment. The coil n12 is magnetically coupled to the coil n11 of the power transmitting apparatus 105. The relay power receiving apparatus 205 includes a coil n21, instead of the active electrode 22 and the passive electrode 24 described above in the first embodiment. The power receiving apparatus 305 includes a coil n22, instead of the active electrode 31 and the passive electrode 32 described above in the first embodiment. The coil n22 is magnetically coupled to the active electrode 21 of the relay power receiving apparatus 205. Since the other components in the wireless power transmission system 405 are similar to those in the first embodiment, a description of them is omitted herein.

The magnetic coupling between the coils n11 and n12 causes the power to be transmitted from the power transmitting apparatus 105 to the relay power receiving apparatus 205. The magnetic coupling between the coils n21 and n22 causes the power to be transmitted from the relay power receiving apparatus 205 to the power receiving apparatus 305. As described above, even in the wireless power transmission system 405 using the magnetic-field coupling, it is possible to transmit the power to the power receiving apparatus 305 via the relay power receiving apparatus 205 while the power from the power transmitting apparatus 105 is being transmitted to the relay power receiving apparatus 205, as in the first embodiment.

Accordingly, it is possible to simultaneously charge the secondary cells in the two apparatuses: the relay power receiving apparatus 205 and the power receiving apparatus 305. In addition, since the relay power receiving apparatus 205 directly transmits the alternating-current voltage that is received to the power receiving apparatus 305 without converting the alternating-current voltage received from the power transmitting apparatus 105 into the direct-current voltage and converting the direct-current voltage into the alternating-current voltage again, it is possible to reduce the loss caused by the conversion to achieve the efficient power transmission. Even if the secondary cell in one apparatus is in the full charge state, it is possible to continue the transmission of the power to the other apparatus.

REFERENCE SIGNS LIST 11 active electrode (external-side active electrode, transmission-side active electrode)
12 passive electrode (external-side passive electrode, transmission-side passive electrode)
13 control circuit
21 active electrode (first active electrode, first reception-side active electrode)
22 active electrode (second active electrode, second reception-side active electrode)
23 passive electrode (first passive electrode, first reception-side passive electrode)
24 passive electrode (second passive electrode, second reception-side passive electrode)
25 load supply circuit
31 active electrode (third reception-side active electrode)
32 passive electrode (third reception-side passive electrode)
261 power output circuit
262 USB terminal
263 transformer
27 control circuit (control unit)
28 load supply circuit
28A bidirectional AC-DC converter
33 load supply circuit
34 control circuit
51 charging circuit
52 secondary cell
101, 104, 105 power transmitting apparatus
201, 202, 203, 204, 205 relay power receiving apparatus (first power receiving apparatus)
301, 304, 305 power receiving apparatus (second power receiving apparatus)
401, 402, 403, 404, 404A, 405 wireless power transmission system
n11 coil (external-side coil)
n12 coil (input-side coil)
n21 coil (output-side coil)
S1 switching element (switching unit, first switch)
S2 switching element (switching unit, second switch)
S3 switching element (switching unit, third switch)
S4, S5 three-terminal switching element
Q1, Q2, Q3, Q4 MOSFET

The invention claimed is:

1. An electronic apparatus for wirelessly receiving and transmitting power, the apparatus comprising:
   an input circuit configured to wirelessly receive power from an external power source;
   a supply circuit configured to rectify and smooth the power received by the input circuit and supply the power to a load; and an output circuit electrically coupled to the input circuit and configured to wirelessly transmit the power received by the input circuit to an external power receiving device.

2. The electronic apparatus according to claim 1, wherein the input circuit includes:
a first active electrode disposed in the electronic apparatus to oppose an active electrode of the external power source; and
a first passive electrode disposed in the electronic apparatus to oppose a passive electrode of the external power source,
wherein the first active electrode and first passive electrode receive voltage induced through capacitive coupling from the active and passive electrodes of the external power source, respectively, when the electronic apparatus is placed on the external power source.

3. The electronic apparatus according to claim 2, wherein the output circuit includes:
a second active electrode coupled to the first active electrode; and
a second passive electrode coupled to the first passive electrode.

4. The electronic apparatus according to claim 1,
wherein the input circuit includes a first coil that magnetically couples to a second coil in the external power source and receives current excited by magnetic coupling between the first and second coils when the electronic apparatus is placed on the external power source, and
wherein the output circuit includes a third coil coupled to the first coil.

5. The electronic apparatus according to claim 1, further comprising:
a switching circuit configured to connect and disconnect the input circuit to the supply circuit and that further connects and disconnects the input circuit to the output circuit; and
a controller configured to control switching of the switching circuit.

6. The electronic apparatus according to claim 5, wherein the controller is configured to control the switching circuit so that the power received by the input circuit is alternately output to the output circuit and the supply circuit.

7. The electronic apparatus according to claim 6,
wherein the supply circuit includes a bidirectional input-output and is connected to the output circuit, and
wherein the switching circuit connects the supply circuit to the output circuit or disconnects the supply circuit from the output circuit.

8. The electronic apparatus according to claim 7, wherein the switching circuit includes:
a first switch disposed between the supply circuit and the input circuit;
a second switch disposed between a node between the first switch and the input circuit and the output circuit; and
a third switch connected between a node between the first switch and the second switch and the input circuit.

9. The electronic apparatus according to claim 1, further comprising:
a transformer including a primary winding connected to the input circuit and a secondary winding connected to the output circuit,
wherein the secondary winding includes a tap, and
wherein the supply circuit is connected to the tap and the output circuit.

10. The electronic apparatus according to claim 1, further comprising:
a power output circuit coupled to the input circuit, where the power output circuit is configured to step down an alternating-current voltage induced at the input circuit;
a charging circuit coupled to the power output circuit by one of a connecting terminal and a transformer; and
a battery configured to receive a stepped down voltage from the charging circuit.

11. A wireless power transmission system comprising:
a power transmitting device including:
an active electrode,
a passive electrode, and
a power source configured to apply an alternating-current voltage to the active and passive electrodes;
a first power receiving device including:
a first housing;
a first active electrode disposed in the first housing to oppose the active electrode of the power transmitting device when the first power receiving device is placed the power transmitting device,
a first passive electrode disposed in the first housing to oppose the passive electrode of the power transmitting device when the first power receiving device is placed on the power transmitting device,
a second active electrode coupled to the first active electrode, and
a second passive electrode coupled to the first passive electrode; and
a second power receiving device including:
a second housing
a third active electrode disposed in the second housing to oppose the second active electrode of the first power receiving device when the second power receiving device is placed on the first power receiving device,
a third passive electrode disposed in the second housing to oppose the second passive electrode of the first power receiving device when the second power receiving device is placed on the first power receiving device, and
a load configured to receive a voltage induced at the third active and passive electrodes.

12. The wireless power transmission system according to claim 11, wherein the second power receiving device further comprises a circuit configured to rectify and smooth the voltage induced at the third active and passive electrodes and supply the voltage to the load.

13. The wireless power transmission system according to claim 11, wherein the first power receiving device further comprises a supply circuit configured to rectify and smooth the power received by the first active and passive electrodes and supply the power to a load of the first power receiving device.

14. The wireless power transmission system according to claim 13, wherein the first power receiving device further comprises:
a switching circuit configured to connect and disconnect the first active and passive electrodes to the supply circuit and further configured to connect and disconnect the first active and passive electrodes to the second active and passive electrodes; and
a controller configured to control switching of the switching circuit.

15. The wireless power transmission system according to claim 14, wherein the controller is configured to control the switching circuit so that the power received by the first active and passive electrodes is alternately output to the second active and passive electrodes and the supply circuit.

16. A method for wirelessly receiving and transmitting power by a power receiving device, the method comprising:
   wirelessly receiving power at an input circuit from an external power source;
   rectifying and smoothing the power received by the input circuit;
   supplying the rectified and smoothed power to a load; and
   wirelessly transmitting by an output circuit to an external power receiving device the power received by the input circuit.

17. The method according to claim 16, further comprising:
   placing the power receiving device on the external power source such that a first active electrode of the input circuit opposes an active electrode of the external power source and a first passive electrode of the power receiving device opposes a passive electrode of the external power source; and
   receiving, by the first active electrode and first passive electrode, voltage induced through capacitive coupling from the active and passive electrodes of the external power source, respectively.

18. The method according to claim 16, further comprising exciting by magnetic coupling a current between a first coil of the power receiving device and a second coil of the external power source when the power receiving device is placed on the external power source.

19. The method according to claim 16, further comprising:
   connecting and disconnecting, by a switching circuit, the input circuit to the supply circuit; and
   connecting and disconnecting, by a switching circuit, the input circuit to the output circuit.

20. The method according to claim 19, further comprising alternately outputting, by the switching circuit, power received by the input circuit to the output circuit and the supply circuit.

* * * * *